United States Patent [19] [11] Patent Number: 4,497,302
Sasayama et al. [45] Date of Patent: Feb. 5, 1985

| [54] | FUEL CONTROL APPARATUS FOR INTERNAL COMBUSTION ENGINE |
|---|---|
| [75] | Inventors: Takao Sasayama; Matsuo Amano, both of Hitachi, Japan |
| [73] | Assignee: Hitachi, Ltd., Tokyo, Japan |
| [21] | Appl. No.: 471,127 |
| [22] | Filed: Mar. 1, 1983 |
| [30] | Foreign Application Priority Data |
|  | Mar. 3, 1982 [JP] Japan .................................. 47-32361 |
| [51] | Int. Cl.³ .............................. F02P 3/00; F02B 3/00 |
| [52] | U.S. Cl. ...................................... 123/489; 123/440 |
| [58] | Field of Search ............... 123/489, 440, 480, 445, 123/478; 60/276, 285; 318/610; 431/76; 235/150.1 |
| [56] | References Cited |

U.S. PATENT DOCUMENTS

| 4,123,999 | 11/1978 | Asano | 123/489 |
| 4,130,095 | 12/1978 | Bowler et al. | 123/440 |
| 4,131,091 | 12/1978 | Asano et al. | 123/489 |
| 4,187,806 | 2/1980 | Schnurle et al. | 123/440 |
| 4,210,106 | 7/1980 | Wessel et al. | 123/489 |
| 4,228,775 | 10/1980 | Schweikert | 123/489 |
| 4,244,340 | 1/1981 | Herth et al. | 123/440 |
| 4,278,060 | 7/1981 | Isobe et al. | 123/440 |
| 4,282,842 | 8/1981 | Sasayama | 123/440 |
| 4,350,130 | 9/1982 | Ehalman | 123/440 |
| 4,364,356 | 12/1982 | Gerhold | 123/440 |
| 4,402,293 | 9/1983 | Ohgami | 123/489 |

Primary Examiner—Raymond A. Nelli
Attorney, Agent, or Firm—Antonelli, Terry & Wands

[57] ABSTRACT

A fuel injection control apparatus for internal combustion engine includes an air flow meter provided in a path through which air is sucked into an internal combustion engine, a fuel injector for controlling the amount of fuel in response to a signal from the air flow meter to produce the mixture of sucked air and fuel, and an electrical control device including a microprocessor responsive to the signal from the air flow meter to produce, by computation of the microprocessor a signal for controlling the fuel injector. The microprocessor computes the fuel injection amount or duration and dead time on the basis of the signal from the air flow meter. The beginning of the fuel injection by the fuel injector is altered in accordance with the dead time which is variable with the air flow amount.

7 Claims, 12 Drawing Figures

FUEL CONTROL APPARATUS FOR INTERNAL COMBUSTION ENGINE

This invention relates to fuel control apparatus for internal combustion engine, and, more particularly, to a fuel injection control apparatus for internal combustion engine capable of correcting for a response lag in a fuel suction path.

A conventional fuel control apparatus for internal combustion engine has a sensor, responsive to a particular exhaust gas concentration in the exhaust pipe, to produce a signal, which is fed back to the fuel injection control apparatus to thereby control the air-fuel ratio. In particular, generally a solid electrolyte such as, for example, zirconium oxide is used to detect partial pressure of oxygen in the exhaust gases and the air-fuel ratio is controlled to be a stoichiometric equilibrium point (hereinafter, called the theoretical air-fuel ratio).

As shown in FIG. 1A, an exhaust sensor (oxygen or $O_2$) sensor formed mainly of a material including zirconium oxide detects partial pressure of oxygen to produce high-level output when the fuel is rich or low-level output when the fuel is lean, the theroretical air-fuel ratio lying between these high and low levels. As shown in FIG. 1B, an air-fuel ratio adjusting device acts to increase or decrease the air-fuel ratio at a uniform rate with time and the switching between the increase and decrease is made when the output of the oxygen sensor has crossed the reference level. That is, when the sensor changes its output from lean-fuel level to rich-fuel level, the device adjusts to decrease the air-fuel ratio, and when it changes its output from rich-fuel level to lean-fuel level, the device adjusts to increase the ratio. Because of such adjustment, the engine actually wastes time upon feeding fuel and air from fuel supply device to combustion chamber. The air-fuel ratio at which the mixture of fuel and air is actually burnt in the combustion chamber has a phase lag shown in FIG. 1C, corresponding to wasted or dead time on the intake side when the adjustment is made as shown in FIG. 1B. There is dead time on the exhaust side between the completion of fuel and the responding of oxygen sensor, but it is usually smaller than on the intake side. The peaks of the wave of FIG. 1C show excessive values over the average value thereof. The large peak increases harmful components in the exhaust gases and brings about instability in driving.

Thus, since the air-fuel ratio is determined from the partial pressure of oxygen in the exhaust gases afer combustion, a response lag is caused to trouble general feed-back control, and dead time is taken in association with the intake pipe, combustion and exhausting. Consequently, the increase of loop gain in control system causes hunting in the air-fuel ratio and hence brings about an extremely unstable combustion state to increase harmful exhaust gases. The decrease of loop gain makes the response of the system very slow, causing long transient conditions unsatisfactory for the internal combustion engine. Also, the air-fuel ratio is fluctuated with the result that harmful exhaust gases are increased. Therefore, it is necessary to increase the loop gain to limit at which no hunting is caused. However, lag time of system and dead time are fluctuated to a great extent depending on the driving condition of engine, and thus makes it difficult to set up a proper gain.

Further, the fact that the dead time is fluctuated to a great extent depending on the operating condition of the engine means that a time duration from the time when fuel is injected by an injector to the time when the injected fuel is reached to the combustion chamber of a corresponding cylinder through the fuel intake path is fluctuated to a great extent depending on the operating condition of the engine. In a proposed fuel injection control apparatus, the fuel injection timing is not controlled by considering such fluctuations of the dead time, and hence the conventional fuel control apparatus has a disadvantage that a desired fuel amount cannot necessarily be supplied into the combustion chamber when the engine operating condition is changed, whereby by the fuel control can not precisely be carried out.

It is an object of the invention to provide a fuel injection control apparatus for internal combustion engine capable of controlling an engine with high stability and response.

According to this invention, since the amount that the air-fuel ratio is adjusted is stored and delayed and it is used as a reference to modified amount of adjustment, excessive amount of an adjustment associated with dead time is reduced and the limit at which hunting is caused is extended under high loop gain so that the variation of the air-fuel ratio is suppressed. Thus, harmful exhaust gases are prevented from occuring and high response is obtained. In other words, dead time in the total distance of a known system is calculated from the output of a hot wire flow sensor, or the flow rate of intake air, and the amount of adjustment delayed by that dead time is sampled upon level change of output from the oxygen sensor to be used as a reference to control.

These and other objects will become more apparent when a preferred embodiment of the present invention is considered in connection with the accompanying drawings in which.

Figure 1:
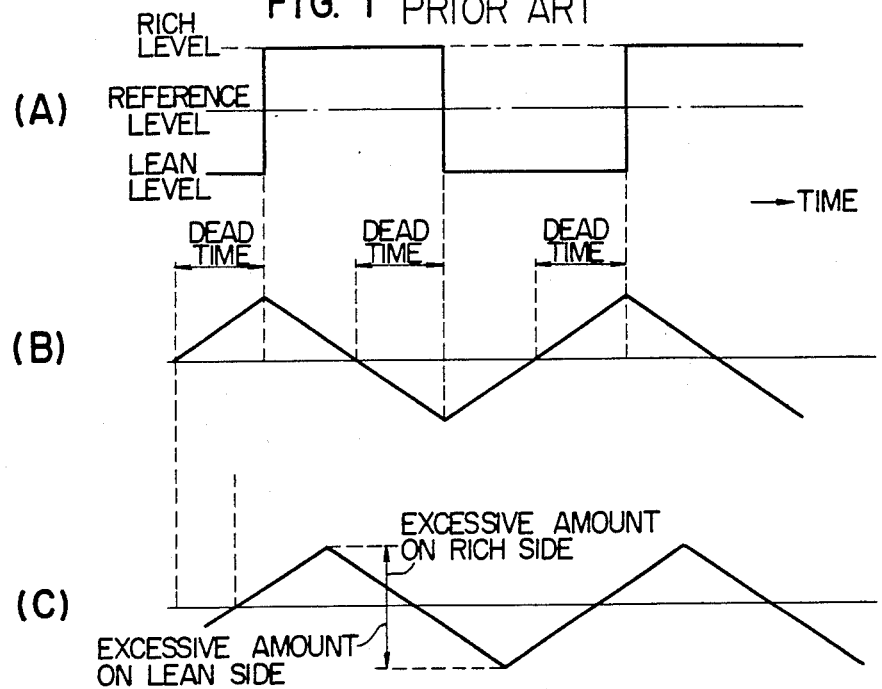
FIGS. 1A, 1B and 1C are explanatory diagrams useful for explaining the conventional fuel control method.
Figure 2:
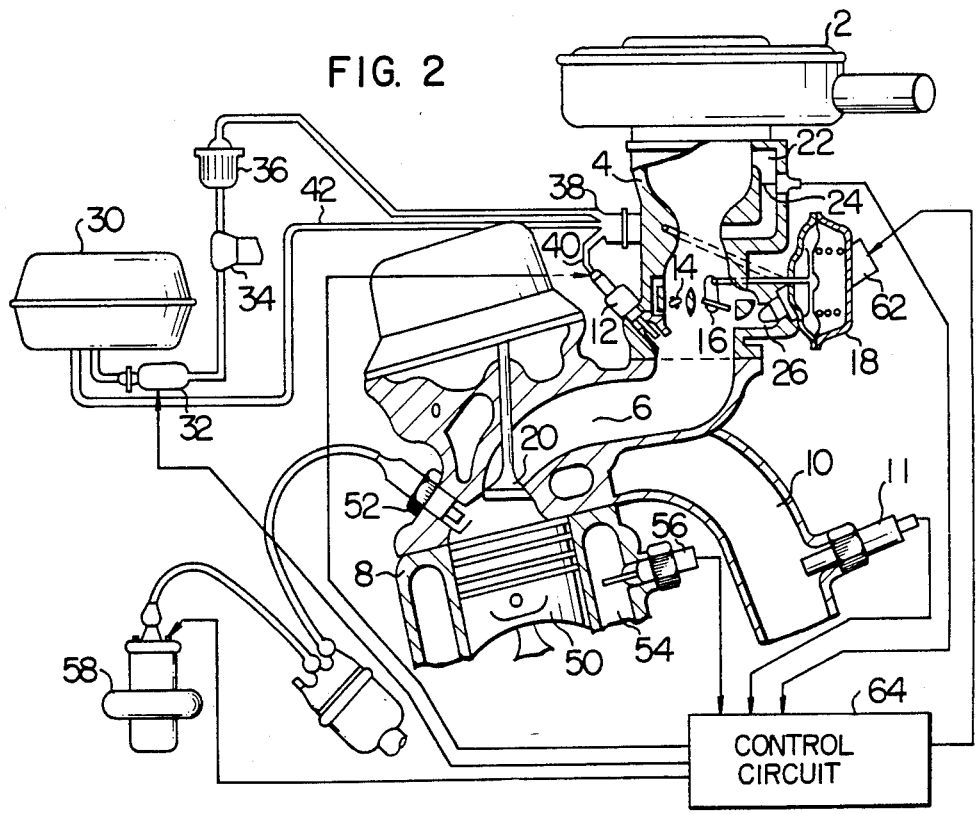
FIG. 2 is a partial cross-sectional view of an engine control system.

Referring to FIG. 2, sucked air is fed to a cylinder 8 through an air cleaner 2, a throttle chamber 4, and an intake pipe 6. The combustion gas in the cylinder 8 is exhausted to the air through an exhaust pipe 10. The oxygen concentration of the exhaust gases is detected by an $O_2$ sensor 11.

A fuel injector 12 is provided in the throttle chamber 4, with the fuel injector 12 being adapted to inject fuel which is then atomized within the passage of throttle chamber 4 through which air is drawn and, as a result, a mixture of fuel and drawn in air is formed and then fed through an intake pipe 6 and through an open intake valve 20, to the combustion chamber of the cylinder 8.

Throttle valves 14 and 16 are provided near the outlet of the injector 12, with the throttle valve 14 being constructed to be mechanically connected to the accelerator pedal which the operator drives. The throttle valve 16 is so arranged as to be driven by a diaphragm 18 and, when the amount of air flow is small, the valve 16 is completely closed, and as the air flow increases, the negative pressure on the diaphragm 18 increases to gradually open the valve 16, preventing an increase in the suction resistance.

An air-flow passage 22 is provided above the throttle valves 14 and 16 in the throttle chamber 4, with an electric heater 24, forming a hot-wire type air-flow meter, responsive to the rate of the air flow to produce an electric signal which is determined by the relation between the rate of air flow and the amount of heat from the heater 24, being disposed in the air flow passage 22. Since the heater 24 is provided in the air-flow passage 22, it can be protected from the high-temperature gas produced upon a back fire in the cylinder 8 and prevented from the contamination by dust and the like in the drawn in air. The air-flow passage 22 has its outlet near the narrowest portion of the venturi tube and its inlet on the upstream side thereof.

The fuel in the fuel injector 12 is fed from a fuel tank 30 to a fuel-pressure regulator 38 through a fuel pump 32, a fuel damper 34 and a filter 36. The fuel pressure regulator 38 supplies fuel under pressure to the injector 12 through a pipe 40 and also feeds fuel back to the fuel tank 30 through a return pipe 42 in order that the difference between the pressure in the intake pipe 6 into which fuel is injected from the injection 12, and the pressure of the fuel fed to the injector 12 can be maintained constant.

The mixture of fuel and air drawn through the intake valve 20 is compressed by a piston 50 and then burnt by sparking of an ignition plug 52. The combustion of the mixture is converted to a kinetic energy. The cylinder 8 is cooled by cooling water 54 and the resulting temperature of the used cooling water is measured by a water temperature sensor 56 and used as the engine temperature. The ignition plug 52 is supplied with a high voltage from an ignition coil 58 in synchronism with the ignition operation.

In addition, the crankshaft (not shown) is provided with a crank angle sensor which generates a reference angle signal and a position signal at every reference crank angle and at every constant angle (for example, 0.5 degrees) as the engine rotates, respectively.

The electric signals from the output of this crank angle sensor, outputs of the water temperature sensor 56 and heater 24 are supplied to a control circuit 64 formed of a microcomputer or the like and arithmetically processed by the control circuit 64, the output of which is used to drive the fuel injector 12 and ignition coil 58.

In the engine system to be controlled as described above, a bypass 26 communicating with the intake pipe 6 is provided over the throttle valve 16 in the throttle chamber 4, and this bypass 26 is provided with a bypass valve 62 to be controlled to open and close. The drive portion of this bypass valve 62 is supplied with a signal from the control circuit 64 so that the valve 62 is controlled to open and close.

The bypass valve 62 faces to the bypass 26 going around the throttle valve 16 and is controlled to open and close by a pulse current. This bypass valve 62 changes the cross-sectional area of the bypass 26 in response to the amount that the valve is lifted by the output of the control circuit 64 through the driving system. That is, the control circuit 64 generates an open/close period signal for controlling the driving system to supply a control signal to the drive portion of the bypass valve 62 thereby adjusting the amount of lifting the bypass valve 62.

Figure 3:
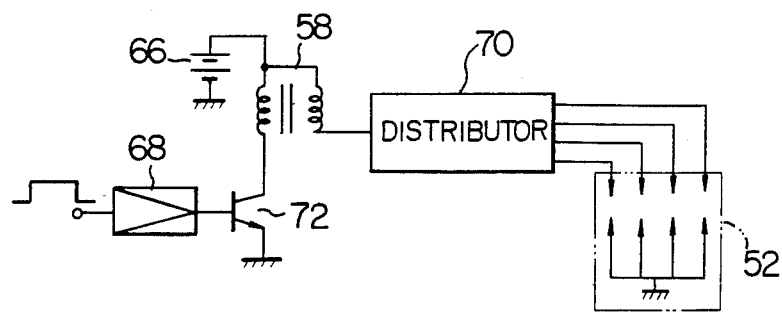
FIG. 3 is a schematic view of the ignition device in FIG. 2.
Figure 4:
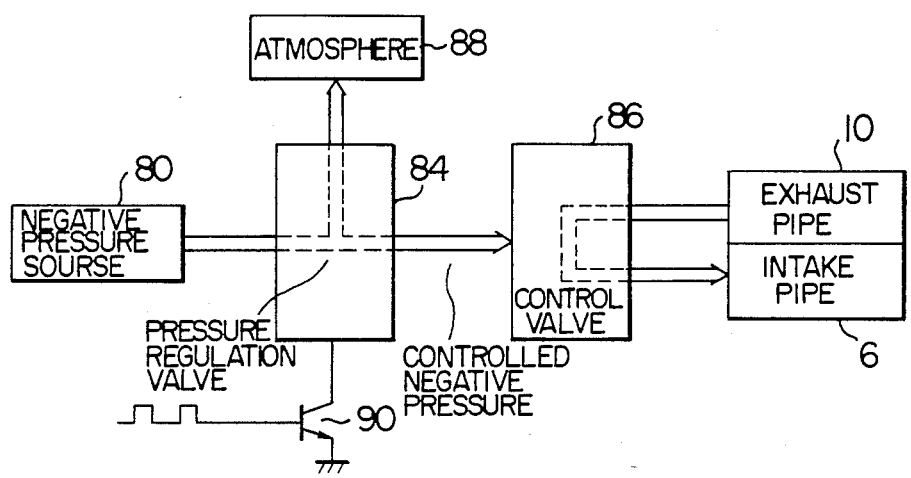
FIG. 4 is a diagram of an exhaust gas recirculation system.

As shown in FIG. 3, a pulse current is supplied through an amplifier 68 to a power transistor 72 to make it conductive. Consequently, current flows through the primary of an ignition coil 68 from a battery 66 and, when this pulse current falls off, the transistor 72 is nonconductive and hence a high voltage is induced in the secondary of the ignition coil 58. This induced high voltage is distributed to each of the ignition plugs 52 which is disposed in each cylinder of the engine, in synchronism with the rotation of engine.

As shown in, the exhaust gas recirculation (hereinafter, referred to as EGR) system, a constant negative pressure from a negative pressure source 80 is exerted through a pressure control valve 84 onto a control valve 86. The pressure control valve 84 controls the constant negative pressure of the negative pressure source 80 to be divided into partial pressures on the atmosphere 88 and the control valve 86, the ratio of which is controlled in accordance with the duty ratio of the repetitive pulse applied to the pressure control valve 84 from a transistor 90. Thus, the negative pressure applied on the control valve 86 is determined by the on-duty ratio of the pulse from the transistor 90. The controlled negative pressure from the valve 84 controls the amount of EGR from the exhaust pipe 10 to the intake pipe 6.

Figure 5:
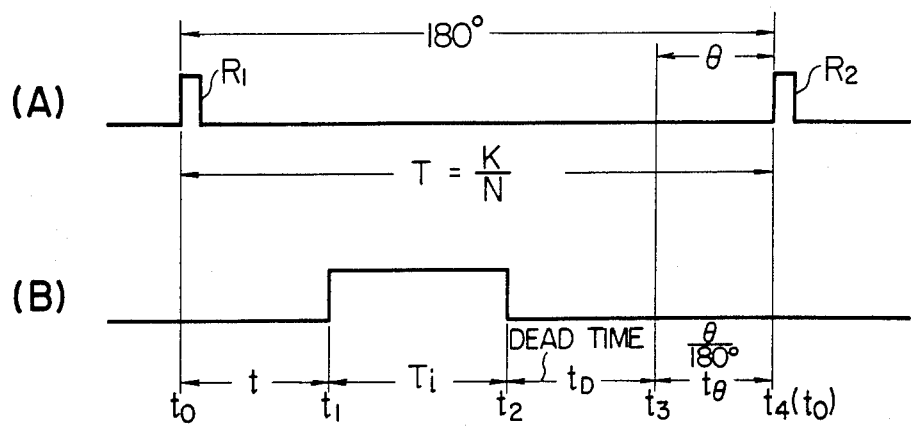
FIG. 5 is a fuel injection timing chart for a fluid control apparatus of the present invention.

In (A) of FIG. 5, a waveform of reference angle pulses $R_1$ and $R_2$ is shown wherein each of the pulses $R_1$, $R_2$ is produced at every predetermined reference crank angle, 180° in this case. When the engine rotation speed N is determined, a period of time T between the reference pulses can be obtained from the equation, $T=K/N$, where K is a constant. In (B) of FIG. 5, a waveform of an injection pulse for the injector 12 is shown, and in this case the fuel injection by the injector 12 begins at time $t_1$ and terminates at time $t_2$. Namely, a time duration $T_i$ represents the fuel injection period. Time $t_3$ is the closing time of the intake valve 20 of the corresponding cylinder. The valve closing angle is fixed at a predetermined crank angle $\theta$ from the reference postion where the reference pulse $R_2$ is produced. Thus, when the engine rotation speed N is determined, a time duration $t_\theta$ from the intake valve closing time ($t_3$) to the occurence of the reference pulse $R_2$ can be obtained from the equation, $t_\theta = (\theta/180) \times T$. A time duration $t_D$ from time $t_2$ to time $t_3$ represents the dead time described above. The finally injected fuel injected at time $t_2$ is delivered in the intake pipe 6 and passed through the intake valve 20 at time $t_3$, at which the intake valve 20 is closed. As described above, the dead time $t_D$ fluctuates to a great extent depending on the engine operating condition. According to the present invention, since the beginning time ($t_1$) of the fuel injection is altered in accordance with the fluctuations of the dead time $t_D$, almost all of the fuel injected during the period $T_i$ is surely supplied into the combustion chamber in the form of air-fuel mixture under any operating conditions of the engine, whereby accurate fuel control can be effected. Moreover, since the mixture is supplied into the combustion chamber at appropriate timing, a stratified charge of mixture enriching toward the spark plug side is formed in the combustion chamber. By this stratified charge good combustion of the mixture is obtained which contributes exhaust gas purification.

The dead time $t_D$ can be obtained from the following equation:

$$t_D = L_1/v_A$$

where $L_1$ is intake manifold length, and $v_A$ is intake air flow rate which is directly proportional to an intake air amount $Q_A$. Therefore, the dead time $t_D$ is obtained by detecting the intake air amount $Q_A$ or the intake air flow rate $v_A$.

The beginning time $t_1$ of the fuel injection is determined as a time point preceeding from the occurrence of the reference angle pulse $R_2$ by the total of the fuel injection duration $T_i$, the dead time duration $t_D$ and the time duration $t_{74}$. Practically, however, the beginning time $t_1$ is determined by calculating a time duration $t$ after the occurrence of the reference angle signal $R_1$ which preceeds the injection, according to the following equation:

$$t = T - (T_i + t_D + t_\theta)$$
$$= \left(1 - \frac{\theta}{180}\right) T - T_i - t_D.$$

Although time $t_3$ coincides with the intake valve closing time in FIG. 5, it is not limited to the valve closing time, but may be a time point related to the valve closing time, say near to the intake valve closing time. Further, time $t_3$ may be variable in accordance with a particular characteristic of engines. Where the manifold length $L_1$ is considerably different depending on the cylinders of a multi-cylinder engine, two or more dead times may be employed.

Figure 6:
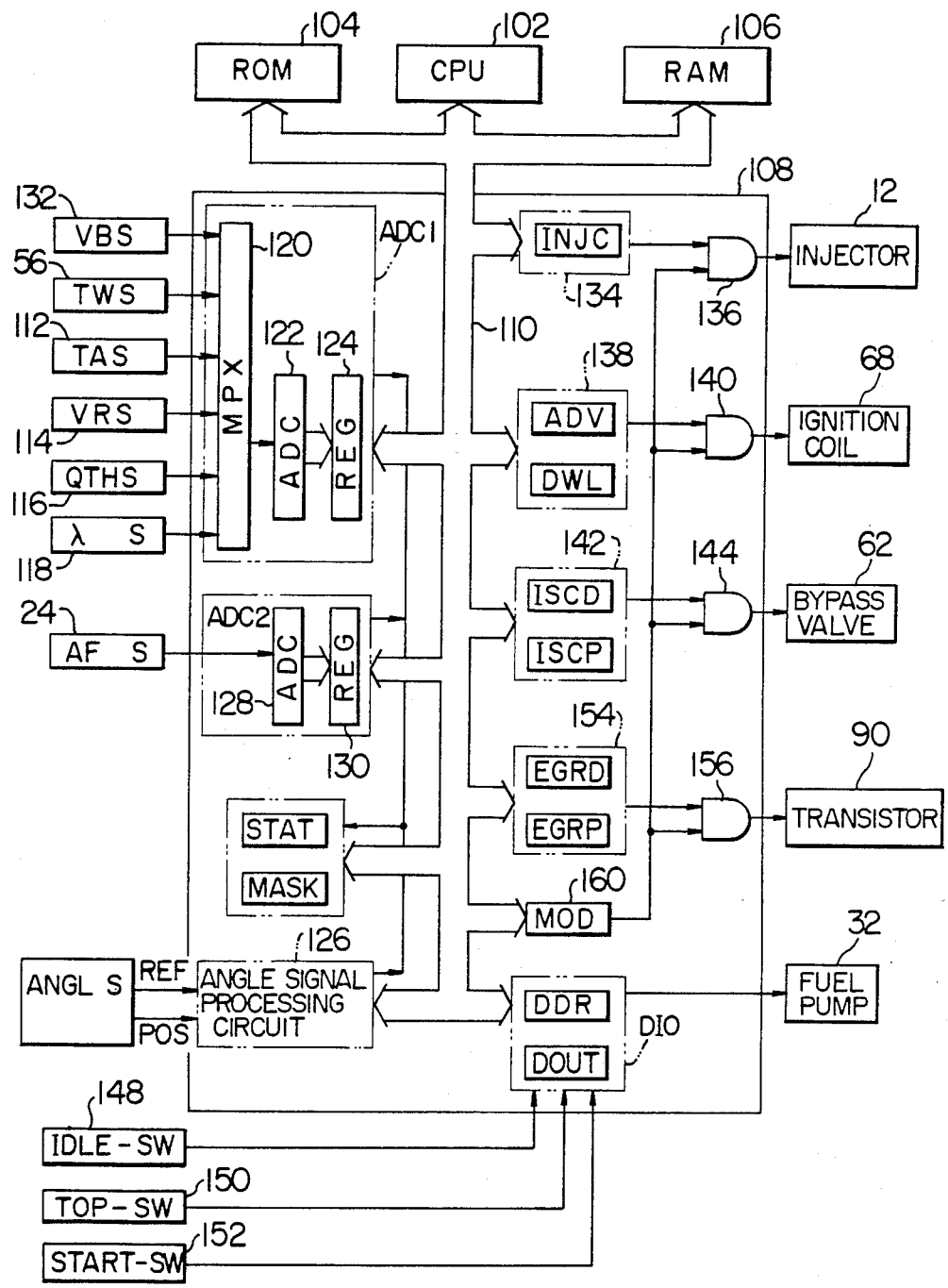
FIG. 6 is a diagram of control system for an engine.

As shown in FIG. 6, the control system comprises a CPU 102, a read-only memory (hereinafter, referred to as ROM) 104, a random access memory (hereinafter, referred to as RAM) 106 and an input/output unit 108. The CPU 102 arithmetically processes the input data from the input/output unit 108 and returns the results to the unit 108 in accordance with various programs stored in the ROM 104. The RAM 106 serves to store all intermediate results of this computation. Bus lines 110, which comprises a data but, a control bus and an address bus, interconnect the CPU 102, ROM 104, RAM 106 and input/output unit 108 to carry various kinds of data therebetween.

The input/output unit 108 comprises a first analog-to-digital converter (hereinafter, referred to as ADC1), a second analog-to-digital converter (hereinafter, referred to as ADC2), an angle signal processing circuit 126, and a discrete input/output circuit for 1-bit, information hereinafter, referred to as DIO).

The ADC1 includes: a multiplexer (hereinafter, referred to as MPX) 120 which is supplied with the outputs from a battery voltage detecting sensor 132 (VBS), a cooling water temperature sensor 56 (TWS), an atmosphere temperature sensor 112 (TAS), a regulation voltage generator 114 (VRS), a throttle angle sensor 116 ($\theta$THS), and a $\lambda$ sensor 118 ($\lambda$S); an analog-to-digital converter 122 (ADC) to which one of the outputs is applied from the MPX 120; and a register 124 (REG) which holds the digital value from the ADC.

The ADC2 includes an analog-to-digital converter 128 (ADC) which is supplied with the output from a flow sensor 24 (AFS), and a register 130 (REG) in which the output of the ADC is set.

An angle sensor 146 (ANGS) produces a signal of a reference crank angle, for example, 180 degrees (REF) and a signal indicative of a very small angle, for example, 0.5-degree crank angle (POS) and supplied them to an angle signal processing circuit 126, where they are shaped in their waveforms.

The DIO is supplied with the outputs from an idle switch 148 (IDLE-SW), a top gear switch 150 (TOP-SW) and a starter switch 152 (START-SW).

Description will hereinafter be described of a pulse output circuit to which the calculated results are supplied from the CPU 102, and objects to be controlled. An injector control circuit 134 (INJC) converts the digital values of the calculated results to a pulse output. Thus, the INJC 134 generates a pulse of the width corresponding to the amount of fuel injection and supplies it through an AND gate 136 to the fuel injector 12.

An ignition pulse generator 138 (IGNC) comprises a register (ADV) for storing the ignition time and a register (DWL) for storing the time the primary current starts to flow through the primary of the ignition coil. The CPU 102 sets such data in the ADV and DWL of the IGNC 138. The pulse based on the data is supplied from the IGNC 138 through an AND gate 140 to the amplifier 68.

The degree to which the bypass valve 62 opens is controlled by the pulse applied from a control circuit (ISCC) 142 through an AND gate 144. The ISCC 142 has a register (ISCD) for storing the pulse width and a register (ISCP) for storing the period of the repetitive pulse.

An EGR amount control pulse generator 154 (EGRC), which permits the transistor 90 to control the EGR control valve 86 shown in FIG. 3, comprises a register EGRD for storing the duty ratio of the pulse and a register EGRP for storing the period of the pulse. The output pulse from the EGRC 154 is applied through an AND gate 156 to the transistor 90.

The input/output signal of 1 bit is controlled by the circuit DIO. The input signals thereto are the IDLE-SW, TOP-SW, and START-SW signals as described above. The output signal is a pulse output signal for driving the fuel pump. The DIO includes a register DDR for determining whether its terminals are used as input or output terminals, and a register DOUT for latching the output data.

Figure 7:
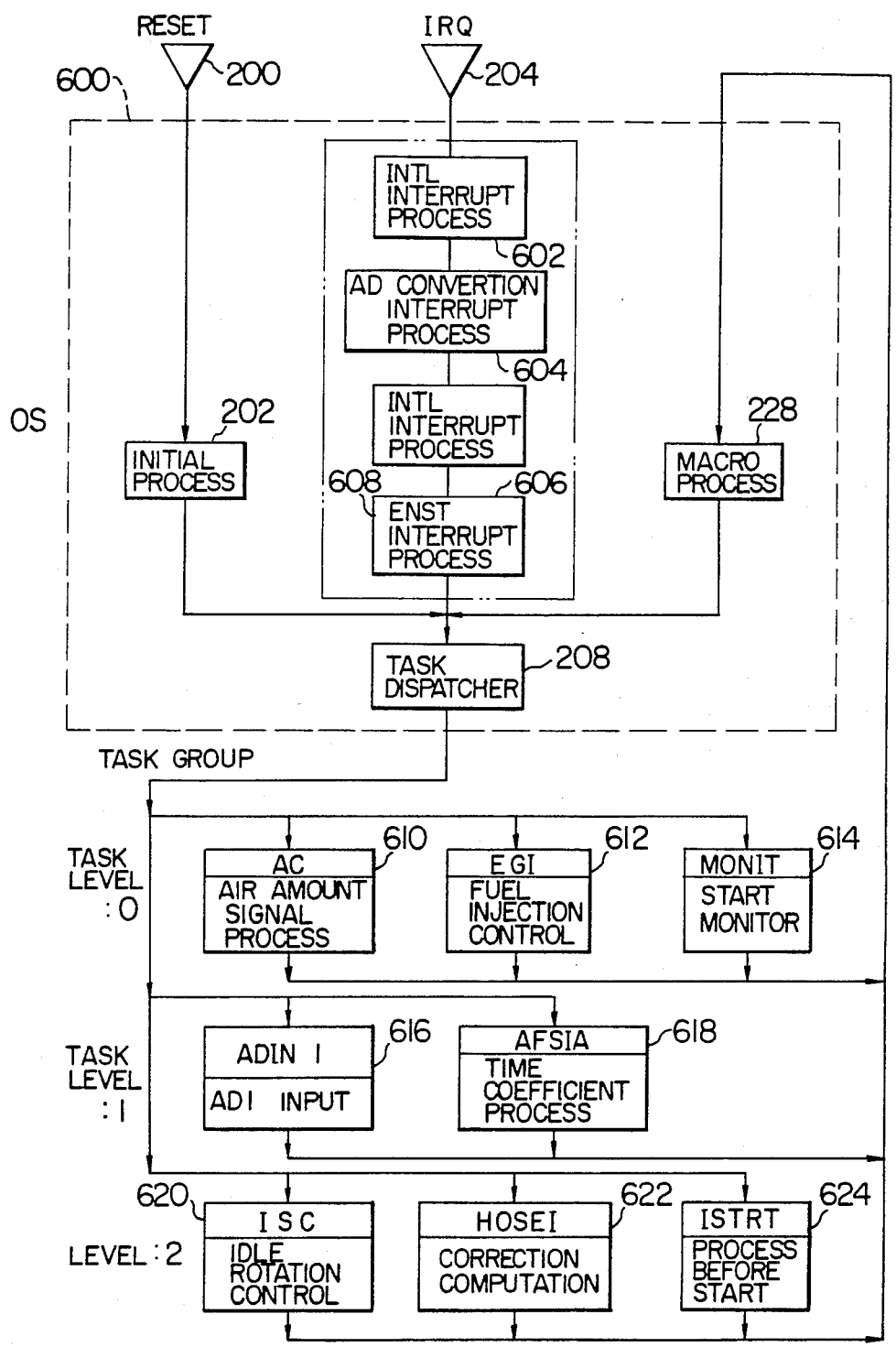
FIG. 7 is a specific flowchart of the control system of FIG. 6.

A register 160 is a register (MOD) for holding an instruction to take various conditions within the input-/output circuit 108. For example, the AND gates 136, 140, 144 and 156 can all be turned on or off by setting an instruction in this register. Thus, the INJC 134, IGNC 138 and ISCC 142 can be controlled to stop or produce output by setting an instruction in the MOD register 160. In FIG. 7, the operating system program OS comprises the initial processing program 202, the interruption processing program 206, the task dispatcher 208 and the macro processing program 228.

The interruption processing program 206 includes various different interruption programs. In an initial interruption program (INTL interruption processing) 602, initial interrupt is caused half-the-number-of-engine-cylinders times, or two times per engine revolution for 4 cylinder engine, by the initial interrupt signal produced in synchronism with engine rotation. The fuel injection time calculated at EGI, task 612 is set up in the EGI register of the input/output interface circuit 108. An A/D conversion interrupt process 604 includes two types: A/D converter-1 interrupt (ADC1) and A/D converter-2 interrupt (ADC2). The A/D converter-1 has precision of 8 bits and is supplied with source voltage, cooling water temperature, sucked air temperature, adjustment of engine and so on. Also, this A/D converter-1 specifies one of such inputs to the multiplexer 120 and at the same time starts to convert. After completion of the conversion, it produces ADC1 interrupt, which is used only before cranking. The A/D converter 128 is supplied with an air flow input, and ADC2 interrupt is produced after end of conversion. This interrupt is also used only before cranking.

In an interval interrupt processing program (INTV interrupt processing program) 606, an INTV interrupt signal is produced for example, at every 10 ms set up in an INTV register and used as a time monitor fundamental signal for task to be started with a constant period. This interrupt signal is used to update the software timer, and permits the task reached a specified time period to start. In an engine stop interrupt processing program (ENST interrupt processing program) 608 which detects the condition of engine stop, counting starts when the INTL interrupt signal is detected, and then an ENST interrupt occurs when the next INTL interrupt signal cannot be detected within a predetermined time, for example, 1 second. If the INTL interrupt signal cannot be detected after 3 ENST interrupts, for example, after lapse of 3 seconds, it is decided that the engine stopped, and supply of current to ignition coil and fuel pump is stopped. After these processes, standby is maintained until a start switch 152 is turned on. Table 1 shows the summary of process for the causes of the interruptions.

TABLE 1

Summary of process for main causes of interruptions

| Causes of interruption | Summary of processes |
|---|---|
| INTL | Set fuel injection time in EGI register |
| ADC1 | Start task ADIN1 |
| ADC2 | Start task AC for amount-of-air-signal processing |
| INTV | Check for start periods of task |

TABLE 1-continued

Summary of process for main causes of interruptions

| Causes of interruption | Summary of processes |
|---|---|
| ENST | ADIN2, EGI, MONIT, ADIN1, AFSIA and ISC which start with constant period Process engine stop and return to initial state |

In the initial process program 202 and macro process program 228, the above processes are performed.

The task group started by the different interrupts mentioned before is as follows: amount-of-air-signal processing task (AS task), fuel injection control task (EGI task) and initial monitor task (MONIT task) for task level 0; AD1 input task (ADIN1 task), and time coefficient processing task (AFSIA task) for task level 1; and idle speed control task (ISC task), compensation calculation task (HOSEI task) and initial preprocess task (ISTRT task) for task level 2.

Table 2 shows assignment of each task level and task functions.

TABLE 2

Assigned task levels and task functions

| Level | Programs | Task number | Functions | Start period |
|---|---|---|---|---|
| | OS | | Interrupt control of engine rotation Other OS processes | 5 ms |
| 0 | AC | 0 | Inhibit v from being received, calculate $(v)^2$, accumulate average $(v)^2$ control acceleration, fuel injection timing computation | 10 ms |
| | EGI | 1 | Control fuel injection time | 20 ms |
| | MONIT | 2 | Monitor start switch (OFF) control fuel injection time at start, start/stop software timer | 40 ms |
| 1 | ADIN1 | 3 | Input to AD converter 1, carlibration filtering | 50 ms |
| | AFSIA | 4 | After-start, after-idle; after-accel. control time coefficient | 120 ms |
| 2 | ISC | 5 | Control idling rotational speed | 200 ms |
| | HOSEI | 6 | Calculate correction coefficient | 300 ms |
| | ISTRT | 7 | Calculate initial EGI, monitor start switch (ON), start, stop software timer, start fuel pump, I/O, LSI | 30 ms |

The start periods of the tasks to be started by different interrupts are predetermined as is evident from Table 2, and stored in ROM 104.

The INTL interrupt process will be described which is one example of processing signals v from the hotwire flow sensor.

Figure 8:
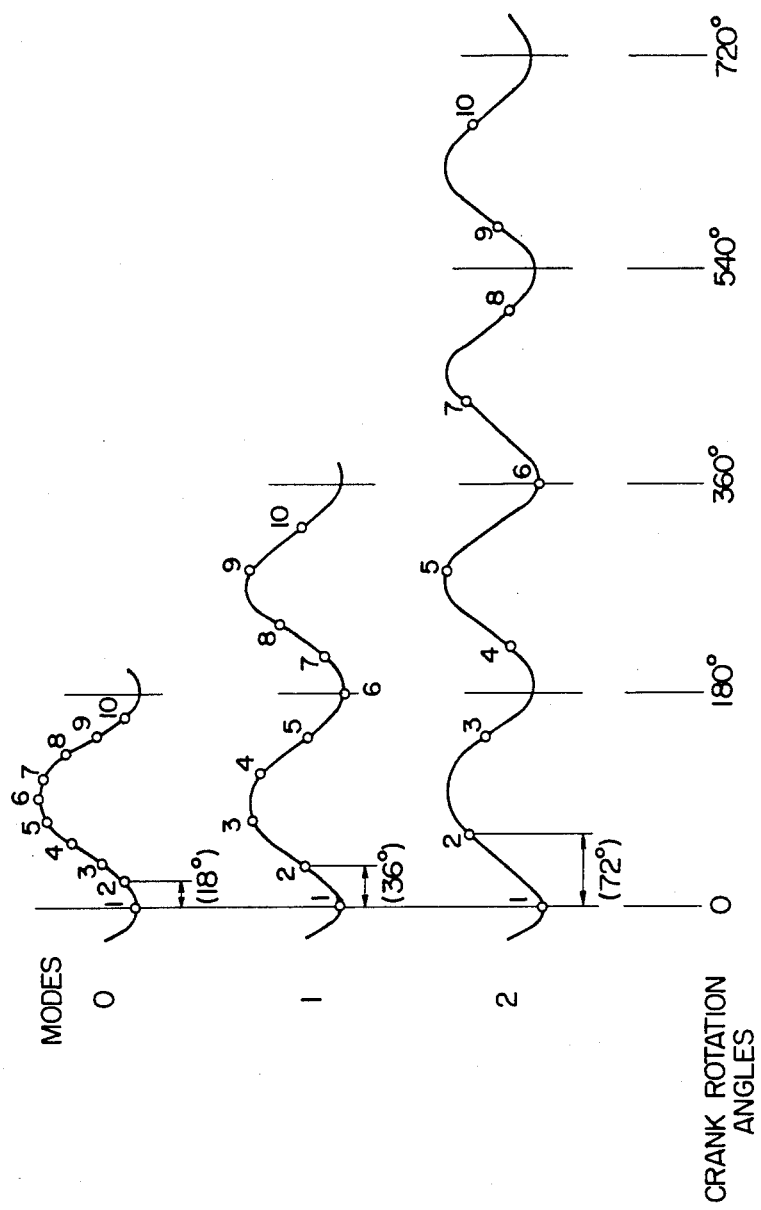
FIG. 8 is a timing chart of sampling the output voltage from hot wire of a sensor.

The signals v from tht hot-wire flow sensor are received by the INTL interruption at different timing for three modes of the revolution speed of engine. That is, as shown in FIG. 8, the revolution speed N of 4-cylinder engine is smaller than 1600 rpm for mode 0, is in the range from 1600 rpm to 3200 rpm, inclusive for mode 1, and is larger than 3200 rpm for mode 2. Thus, one intake stroke corresponds to a crank rotation angle of 180°. In this embodiment, the N is 1600 rpm for mode 0, 3200 rpm for mode 1 and 6400 rpm for mode 2. Thus, the engine in mode 1 rotates through twice the angle in mode 0 and in mode 2 rotates through four times the angle in mode 0. or twice the angle in mode 1 as shown in FIG. 8.

In this embodiment, ten samples are taken in the mode 0 of engine. That is, in mode 0 sampling is mode at each 18° of crank rotation angle, in mode 1 sampling is made at each 36° of crank angle because the revolution speed N is twice that in mode 0 and in mode 2 sampling is made at each 72° of crank angle because the revolution speed N is four times that in mode 0. Therefore, at a crank rotation angle per intake stroke, the same amount of data as in mode 0 is sampled in each mode. If the interval of sampling data is changed in proportion to the revolution speed of engine, the data processing time is constant regardless of change of revolution speed.

Figure 9:
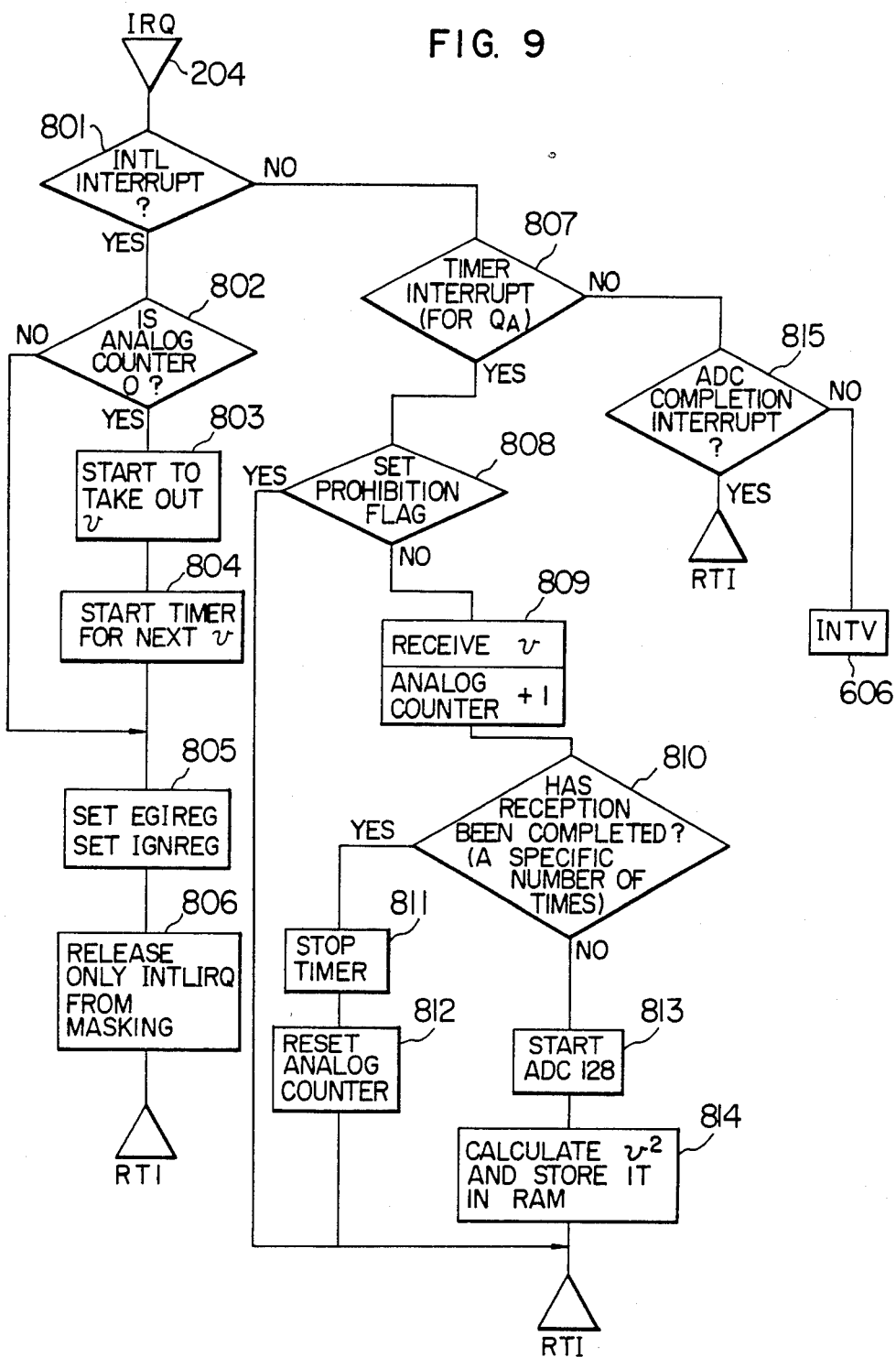
FIG. 9 is a flowchart of INTL interrupt process for sampling the signal from the hot wire flow sensor.

In FIG. 9, at step 801 decision is made of whether an INTL interrupt occurred or not. If the decision is YES, the program goes to step 802, where decision is made of whether the counter for counting the number of receiving times of analog value u (hereinafter referred to as analog counter) is at zero or not. If the decision is YES, the program further goes to step 803, where the A/D converter is started to introduce the amount of air u. When the amount of air, u begins to be drawn in, the program progresses to step 804, where the timer is set at a time when the next amount of air u drawn in, in accordance with the revolution speed of engine and the mode thereof. When at step 804 the timer is set, the program goes to step 805, where EGIREG, IGNREG are set. At step 806, the interrupt for only INTLIRQ is released from inhibition. Then, the INTL interrupt processing program ends. If at step 802 the analog counter is not at zero, the program goes to step 805.

If at step 801 no INTL interrupt occurs, the program goes to step 807, where decision is made of whether it is the timer interrupt for QA or not. If the decision is YES, the program goes to step 808, where decision is made of whether the timer interrupt inhibit flag is set or not. If the decision is YES, the program ends. If it is NO, the program goes to step 809, where the amount of aif, u is introduced so that the analog counter is incremented by 1. At step 810, decision is made of whether the suction of u has been completed or not (whether the contents of the analog counter shows a specified number of times that the suction occurs). If the decision is YES, the program goes to step 811, where the timer is stopped. Then, at step 812 the analog counter is reset.

If at step 810, the suction is not completed, the program goes to step 813, where the A/D converter 128 is started. Then, at step 814, $u^2$ is calculated and stored in RAM.

If at step 807 the interrupt is decided not to be timer interrupt, the program goes to step 815, where decision is made of whether or not it is ADC interrupt. If at step 815 the decision is YES, the program is returned from the interrupt. If at step 815 it is not AD interrupt or at step 816 IST is not 1, the program goes to the INTV interrupt process 606 in FIG. 7.

Figure 10:
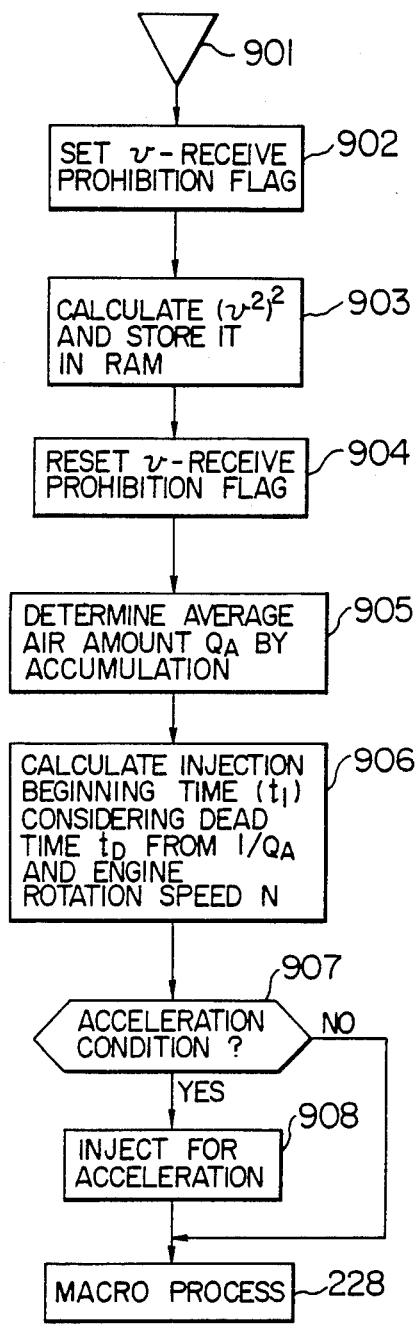
FIG. 10 is a flowchart of air amount signal processing task.

The task of amount-of-air signal process (AC) 610 as shown in FIG. 7 will hereinafter be described. The amount-of-air signal process task is started at step 901 as shown in FIG. 10. When the task is started, the program goes to step 902, where u-suction inhibit flag is set. Then, at step 903, $(u^2)^2$ is calculated to obtain the value of an air flow amount ($Q_A$) and stored in RAM, since the output (u) of a hot-wire type air-flow sensor is directly proportional to the fourth root of the air flow amount ($Q_A$). At step 904, the suction inhibit flag is reset. When the flag is reset, the program goes to step 905, where the value $(u^2)^2$ stored in RAM at step 903 is accumulated and averaged. Then, at step 906, injection timing considering fuel transport lag or dead time $t_D$ is calculated from $1/Q_A$ and revolution speed N of engine as described previously. At step 907 decision is made of whether or not it shows acceleration state of engine. If at step 907 the decision is YES, the program goes to step 908, where acceleration injection is made. If at step 907 it is NO, the program goes to the macro process 228 in FIG. 7 after acceleration injection at step 908.

Figure 11:
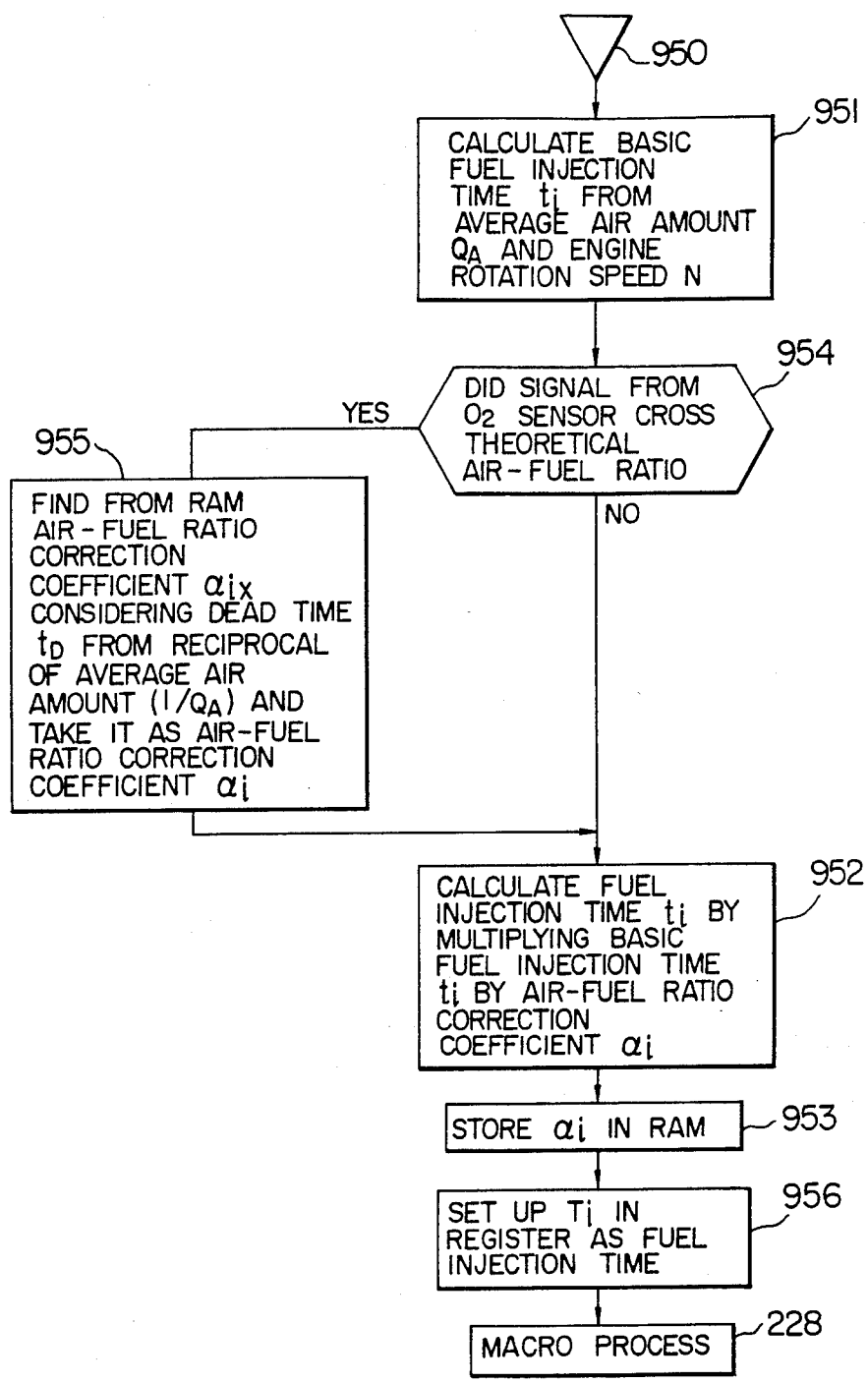
FIG. 11 is a flowchart of fuel injection control task.

The fuel injection control task, as shown in FIG. 11, is started at step 950, then, at step 951, a basic fuel injection time $t_i$ is calculated from average amount of air $Q_A$ and revolution speed N of engine. Then, at step 954, decision is made of whether or not the signal from the oxygen sensor ($O_2$ sensor) has crossed the theoretical air-fuel ratio. If at step 954 the decision is YES, the program goes to step 955, where an air-fuel ratio correction coefficient $\alpha_{ix}$ at the time when the theoretical air-fuel ratio is determined from the reciprocal, $1/Q_A$ of the average air amount, is read from the RAM as $\alpha_i$. If at step 954 the decision is NO, the program goes to step 952. At step 952, a fuel injection time $T_i$ is calculated by multiplying the basic fuel injection time $t_i$ by an air-fuel ratio correction coefficient $\alpha_i$. At step 953, the air-fuel ratio correction coefficient $\alpha_i$ is stored in RAM. At step 956, the fuel injection time $T_i$ is stored in a register. Then, the program progresses to the macro process 228 in FIG. 7.

Figure 12:
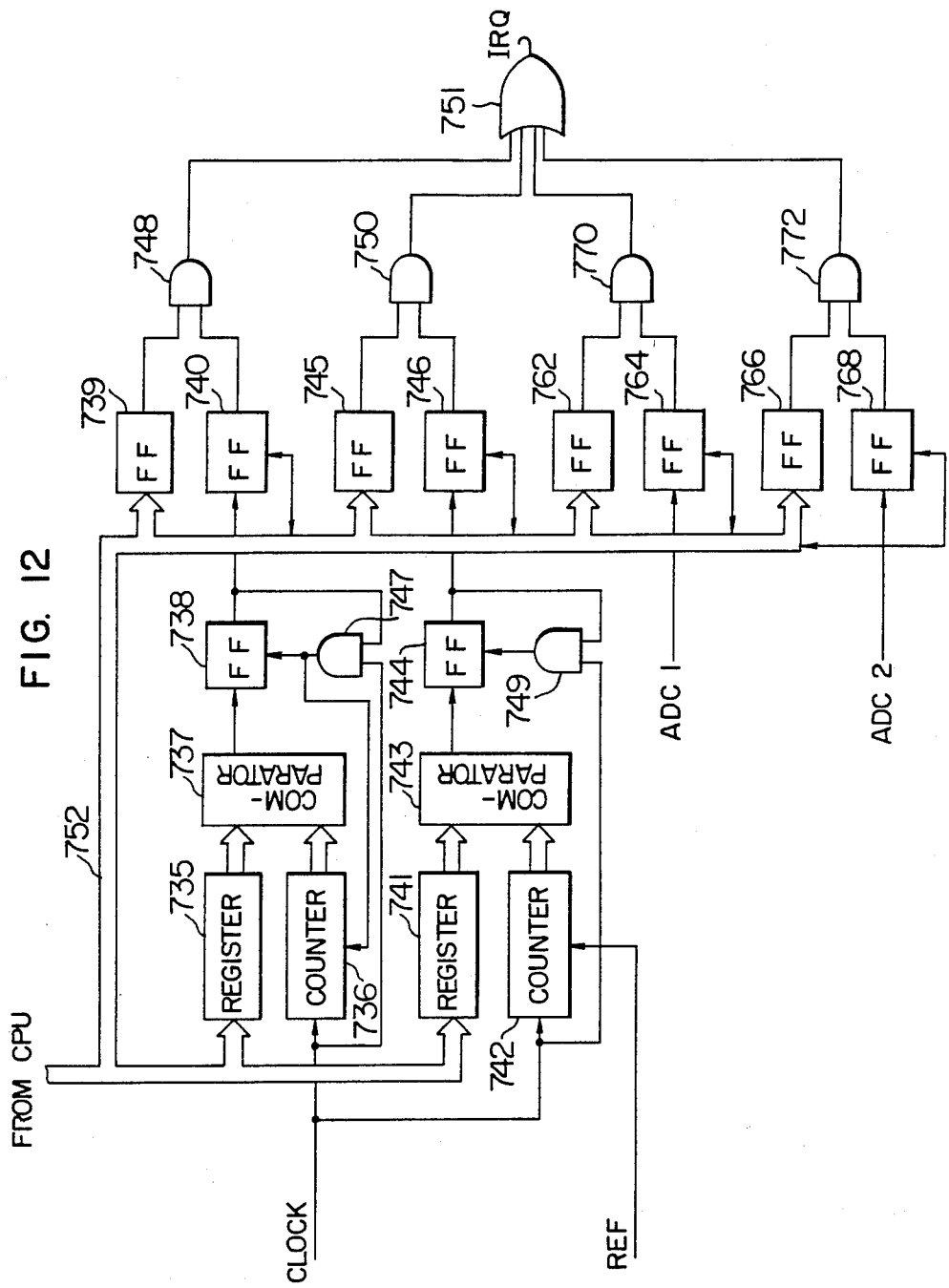
FIG. 12 shows a generator for interrupt IRQ.

FIG. 12 shows a generator circuit for IRQ. A register 735, counter 736, comparator 737 and flip-flop 738 constitute a generator circuit for INTV IRQ. In the register 735, is set the period of INTV IRQ to be generated, for example, in this embodiment, 10 ms. A clock pulse is set in the counter 736 and, when its count reaches the contents of the register 735, it sets the flip-flop 738. At this time, the counter 736 is cleared and again starts to count. Therefore, the INTV IRQ is generated at intervals of constant time (10 msec).

A register 741, counter 742, comparator 743, and flip-flop 744 constitute a generator circuit for ENST IRQ by which engine stop is detected. Similarly, when the count of the counter 742 reaches the contents of the register 741, the comparator 743 sets the flip-flop 744, thus ENST IRQ being generated therefrom. However, the REF pulse is generated at intervals of constant crank angle from the crank angle sensor during engine rotation, to clear the counter 742, which thus does not reach the contents of the register 741 so that no ENST IRQ is generated.

The INTV IRQ generated from the flip-flop 738, ENST IRQ from the flip-flop 744, and IRQs from the ADC1 and ADC2 are respectively set in flip-flops 740, 746, 764, and 768. A signal for permitting the IRQ to be produced or not is set in flip-flops 739, 745, 762 and 766. If "H" level is set in the flip-flops 739, 745, 762 and 766, AND gates 748, 750, 770 and 772 are gated open. At this time, when IRQ is generated, it readily appears from an OR gate 751.

Therefore, the IRQ can be inhibited from generation or released from the inhibition by supplying "H" or "L" level to each of the flip-flops 739, 745, 762 and 766. In addition, when IRQ is generated, the contents of the flip-flops 740, 746, 764 and 768 is supplied to the CPU, which thus can find the cause of IRQ generation.

When the CPU starts to execute program in response to the IRQ, the IRQ signal is required to be cleared, and thus the CPU clears the corresponding one of the flip-flops 740, 746, 764 and 768 to that IRQ.

According to this embodiment, since the reference amount of control is maintained from when the output level from the $O_2$ sensor exceeds the reference level, the amount of control upon level change can be controlled to achieve the theoretical air-fuel ratio, and in addition, for deviation to exceeding rich or lean concentration of fuel, modifying amount of control is always added to cancel the deviation out. Therefore, unlike the prior art, the control for excessively rich concentration of fuel is made to effectively decrease the concentration. Also, since the loop gain can be increased for the same hunting limit, the control gain is increased to decrease harmful exhaust gas and achieve the stability of operation of engine.

The control apparatus according to this invention, as described above is able to stabilize the fuel injection of internal combustion engine and increase response.

What is claimed is:

1. A fuel control apparatus for an internal combustion engine, the fuel control apparatus comprising:
    means for injecting fuel into an intake path of an internal combustion engine, the injected fuel being transported through said intake path and supplied into at least one combustion chamber of the engine;
    means for detecting at least one operating condition of said engine to produce an output signal representing the engine operating condition;
    means responsive to the output signal of said detecting means, for calculating a fuel amount to be injected by said fuel injection means;
    means responsive to the output signal of said detecting means for calculating a dead time which corresponds substantially to a transport time of the injected fuel to said at least one combustion chamber of said engine; and
    means connected to said fuel injection means, said fuel amount calculating means and said dead time calculating means for altering the beginning time of fuel injection by said fuel injection means in accordance with the dead time and the fuel amount, in order that substantially all of the injected fuel can be supplied into said at least one combustion chamber of said engine.

2. A fuel control apparatus according to claim 1, wherein said detecting means detects amount of air flow in said intake path.

3. A fuel control apparatus according to claim 1, further comprising:
    means connected to said altering means, for producing a reference pulse at a predetermined reference crank angle of said engine, and
    means connected to said altering means, for calculating a time duration corresponding to an angle difference between a particular crank angle and said reference crank angle,
    wherein said altering means determines the beginning time of fuel injection on the basis of a period between said reference pulses, a time duration of fuel injection and the time duration corresponding to said angle difference.

4. A fuel control apparatus according to claim 3, wherein said particular angle is related to the closing crank angle of an intake valve of said engine.

5. A fuel control apparatus according to claim 4, wherein said particular angle is variable in accordance with a specific characteristic of said engine.

6. A fuel control apparatus according to claim 1, further comprising means for detecting oxygen concentration of exhaust gases of said engine, wherein said fuel amount calculating means is responsive to output signals of said dead time calculating means and said oxygen concentration detecting means for correcting the fuel amount in accordance with the dead time.

7. A fuel control apparatus according to claim 2, wherein said detecting means includes a hot-wire type air-flow meter.

* * * * *